(12) United States Patent
Katsuhisa

(10) Patent No.: US 11,130,241 B2
(45) Date of Patent: Sep. 28, 2021

(54) ROBOT

(71) Applicant: Fanuc Corporation, Yamanashi (JP)

(72) Inventor: Hiroshi Katsuhisa, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 232 days.

(21) Appl. No.: 16/453,628

(22) Filed: Jun. 26, 2019

(65) Prior Publication Data

US 2020/0016766 A1 Jan. 16, 2020

(30) Foreign Application Priority Data

Jul. 12, 2018 (JP) .............................. JP2018-132195

(51) Int. Cl.
*B25J 13/00* (2006.01)
*B25J 13/06* (2006.01)
*B25J 9/16* (2006.01)

(52) U.S. Cl.
CPC ............. *B25J 13/06* (2013.01); *B25J 9/1697* (2013.01)

(58) Field of Classification Search
USPC ................................................. 700/245–264
See application file for complete search history.

(56) References Cited

U.S. PATENT DOCUMENTS

| | | | |
|---|---|---|---|
| 6,218,802 B1 * | 4/2001 | Onoue ................. | G05B 19/425 318/567 |
| 8,155,787 B2 * | 4/2012 | Chalubert .............. | B25J 9/1671 700/245 |
| 8,781,629 B2 * | 7/2014 | Ota ......................... | B25J 9/1671 700/259 |
| 8,808,164 B2 * | 8/2014 | Hoffman ................ | A61B 34/25 600/101 |
| 10,278,782 B2 * | 5/2019 | Jarc ........................ | A61B 34/71 |
| 2001/0037163 A1 * | 11/2001 | Allard .................... | B25J 9/1689 700/245 |
| 2002/0105482 A1 * | 8/2002 | Lemelson ............... | G06F 3/013 345/7 |
| 2003/0020755 A1 * | 1/2003 | Lemelson ............... | G06F 3/013 715/786 |
| 2004/0243282 A1 * | 12/2004 | Watanabe .............. | B25J 9/1697 700/259 |

(Continued)

FOREIGN PATENT DOCUMENTS

| | | |
|---|---|---|
| JP | 2013-022651 A | 2/2013 |
| JP | 2016-209991 A | 12/2016 |

(Continued)

*Primary Examiner* — Jonathan L Sample
(74) *Attorney, Agent, or Firm* — Shackleford, Bowen, McKinley & Norton, LLP

(57) ABSTRACT

This robot includes a robot arm, a controller which controls the robot arm, an operation panel which sends a control signal to the controller, a camera which is provided in the operation panel and which captures images of an operator who operates the operation panel, a determination means which determines whether or not the operator is looking at a surface of the operation panel on which an operation portion is provided on the basis of the images captured by the camera, and a limitation means which limits motion of the robot arm when it is determined that the operator is looking at the surface or when it is determined that the operator has continuously been looking at the surface.

7 Claims, 5 Drawing Sheets

(56) References Cited

U.S. PATENT DOCUMENTS

| | | | | |
|---|---|---|---|---|
| 2012/0182392 A1* | 7/2012 | Kearns | ............... | B25J 19/023 348/46 |
| 2013/0030571 A1* | 1/2013 | Ruiz Morales | ..... | G06F 3/04842 700/259 |
| 2014/0121834 A1* | 5/2014 | Ogawa | ............... | A61B 34/30 700/257 |
| 2014/0160004 A1* | 6/2014 | Katz | ............... | G06F 3/04842 345/156 |
| 2016/0096275 A1* | 4/2016 | Miyakoshi | ............ | B25J 13/06 700/264 |
| 2016/0271800 A1* | 9/2016 | Stubbs | ............... | B25J 9/1666 |
| 2016/0303739 A1* | 10/2016 | Apkarian | ............... | B25J 3/04 |
| 2017/0008174 A1* | 1/2017 | Rosen | ............... | B25J 9/1694 |
| 2017/0136621 A1* | 5/2017 | Benaim | ............... | G06F 3/013 |
| 2017/0140491 A1* | 5/2017 | Hayashi | ............... | G05B 19/00 |
| 2017/0252921 A1* | 9/2017 | Hynna | ............ | A61B 17/00234 |
| 2018/0304469 A1* | 10/2018 | Higuchi | ............... | B25J 9/1697 |

FOREIGN PATENT DOCUMENTS

| | | |
|---|---|---|
| JP | 2017-094409 A | 6/2017 |
| WO | WO-2013012018 A1 | 1/2013 |

\* cited by examiner

ROBOT

CROSS-REFERENCE TO RELATED APPLICATIONS

This application is based on and claims priority to Japanese Patent Application No. 2018-132195 filed on Jul. 12, 2018, the entire content of which is incorporated herein by reference.

TECHNICAL FIELD

This invention relates to a robot.

BACKGROUND ART

Conventionally, there is a known robot control method which uses a plurality of cameras for capturing images of an operation area of a robot, and in which whether or not the face of an operator is directed toward the operation area is determined by using the images captured by the camera and motion of the robot is controlled in response to the determination. (See PTL 1, for example.)

Also, there is a motion prediction device which includes a plurality of cameras for detecting line of sight of an operator who performs operations together with the robot, and which informs the operator of predicted motion of the robot, and which urges the operator to recognize the motion of the robot when it is determined that the operator is not aware of the notification on the basis of the line of sight of the operator. (See PTL 2, for example.)

CITATION LIST

Patent Literature

PTL 1

Japanese Unexamined Patent Application, Publication No. 2016-209991

Japanese Unexamined Patent Application, Publication No. 2017-94409

SUMMARY OF INVENTION

A robot according to a first aspect of the present invention includes a robot arm; a controller which controls the robot arm; an operation panel which sends a control signal to the controller; a camera which is provided in the operation panel and which captures images of an operator who operates the operation panel; a determination means which determines whether or not the operator is looking at a surface of the operation panel on which an operation portion is provided on the basis of the images captured by the camera; and a limitation means which limits motion of the robot arm when it is determined that the operator is looking at the surface or when it is determined that the operator has continuously been looking at the surface beyond a predetermined time.

DESCRIPTION OF EMBODIMENTS

A robot according to an embodiment of the present invention will be described below with reference to the accompanying drawings.

Figure 1:
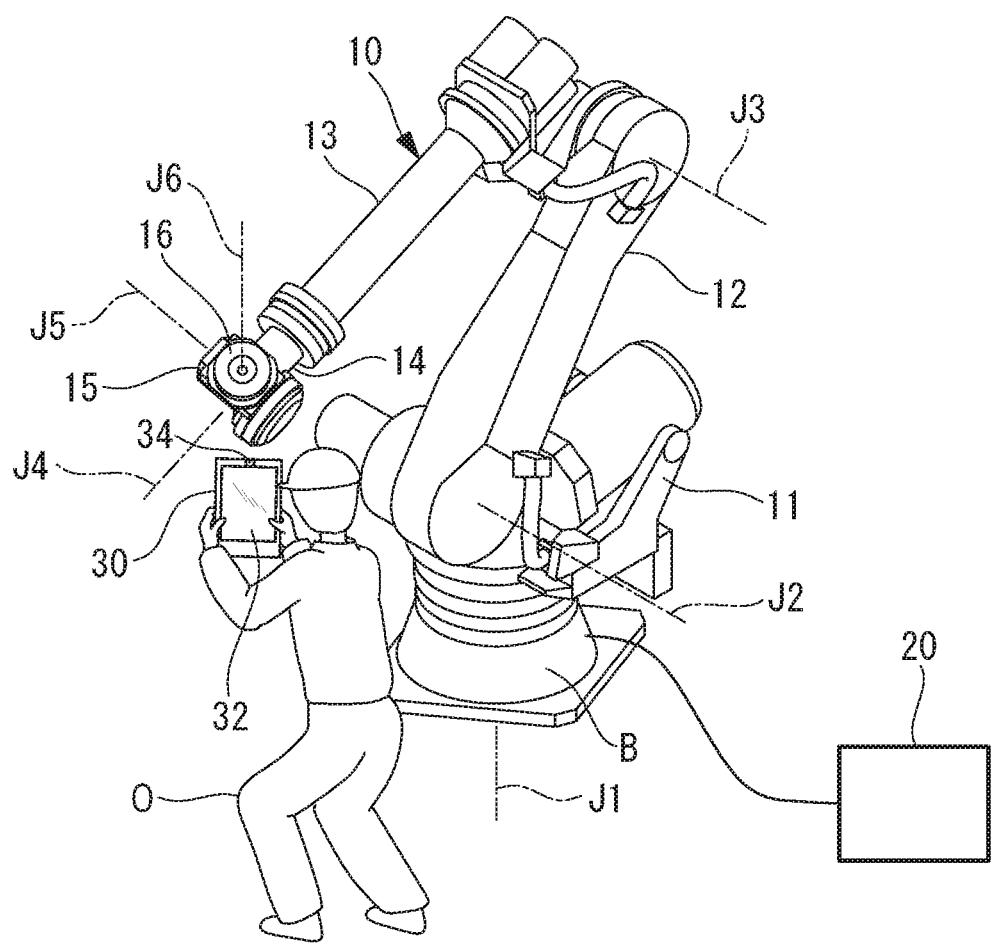
FIG. 1 is a schematic view of a robot according to an embodiment of the present invention.

As shown in FIG. 1, the robot according to this embodiment includes a base B, a robot arm 10, and a controller 20 which controls the robot arm 10. The robot arm 10 includes a plurality of arm members 11, 12, 13, 14, 15, 16, and the arm members 11, 12, 13, 14, 15, 16 respectively move about movable axes J1, J2, J3, J4, J5, J6. Also, the robot shown in FIG. 1 is a vertical articulated robot, however, the robot can be a horizontal articulated robot, and is not limited to a specific type of robot.

The robot arm 10 includes a plurality of servo motors 11a, 12a, 13a, 14a, 15a, 16a (FIG. 3) which respectively drive the arm members 11, 12, 13, 14, 15, 16 about the plurality of movable axes J1, J2, J3, J4, J5, J6. And, each of the servo motors 11a, 12a, 13a, 14a, 15a, 16a includes an operation position detection device (not shown) which detects an operation position of the servo motors 11a, 12a, 13a, 14a, 15a, 16a, and one example of the operation position detection device is an encoder. Detected results of the operation position detection devices are sent to the controller 20.

Figure 3:
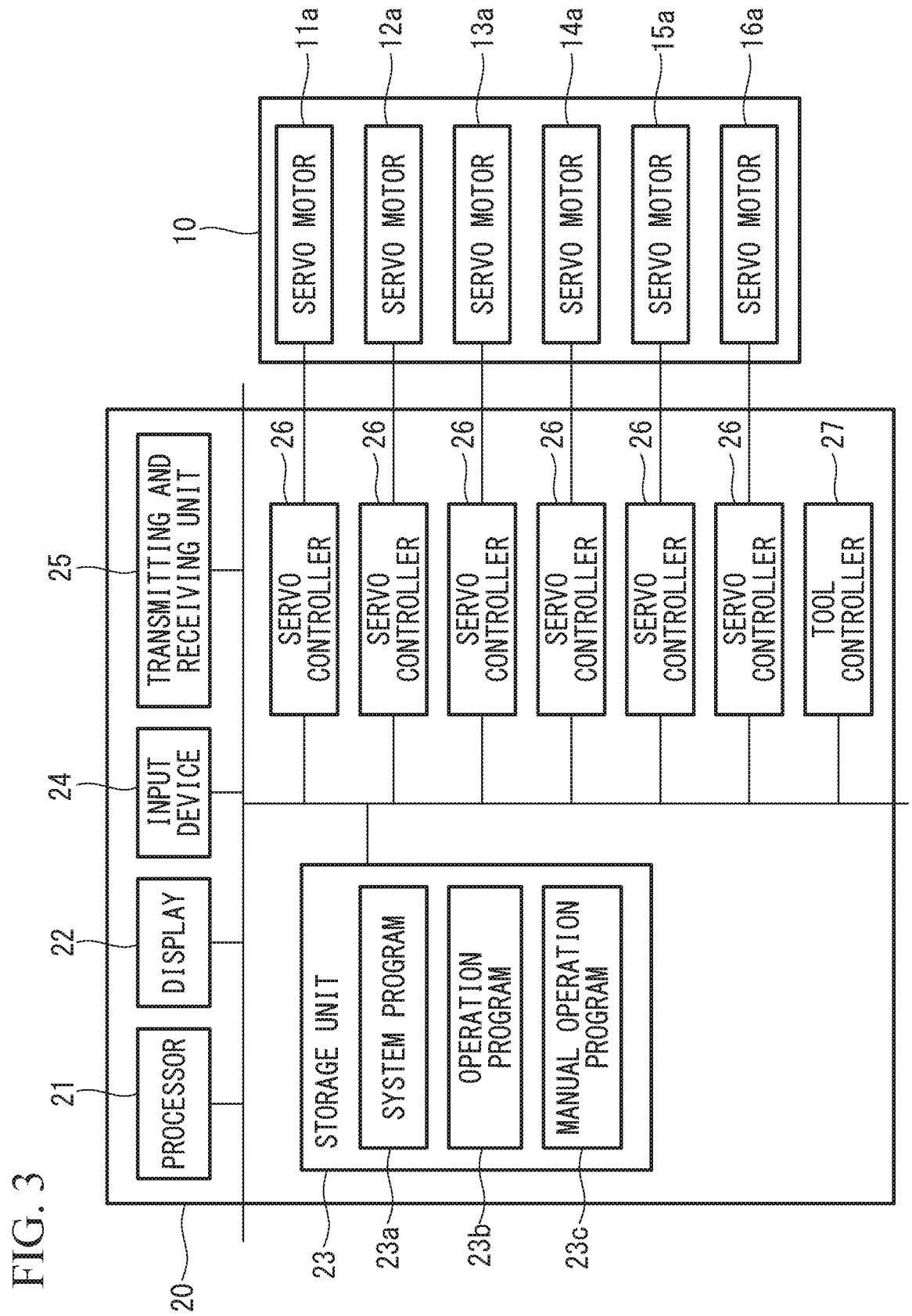
FIG. 3 is a block diagram of a controller of the robot of this embodiment.

As shown in FIG. 3, the controller 20 includes a processor 21 which is a CPU and the like, a display 22, a storage unit 23 having a non-volatile storage, a ROM, a RAM, and the like, an input device 24, a transmitting and receiving unit 25, a plurality of servo controllers 26 which respectively correspond to the servo motors 11a to 16a, and a tool controller 27 which controls a tool (not shown) attached at a distal end portion of the robot arm 10, and the controller 20 controls the servo motors 11a to 16a of the robot 10 and the tool. A system program 23a is stored in the storage unit 23, and the system program 23a provides a basic function of the controller 20.

An operation program 23b is stored in the storage unit 23. The processor 21 controls the servo controllers 26 and the tool controller 27 on the basis of the operation program 23b, and by this, the robot arm 10 performs a predetermined work by using the tool which is provided at the distal end portion of the robot arm 10.

Also, a manual operation program 23c is stored in the storage unit 23. When the controller 20 is in a manual mode, the processor 21 controls the servo controllers 26 and the tool controller 27 in response to control signals, which are sent from an operation panel 30, on the basis of the manual operation program 23c, and by this, the robot arm 10 and the tool are moved in response to an operation input by using the operation panel 30.

Figure 4:
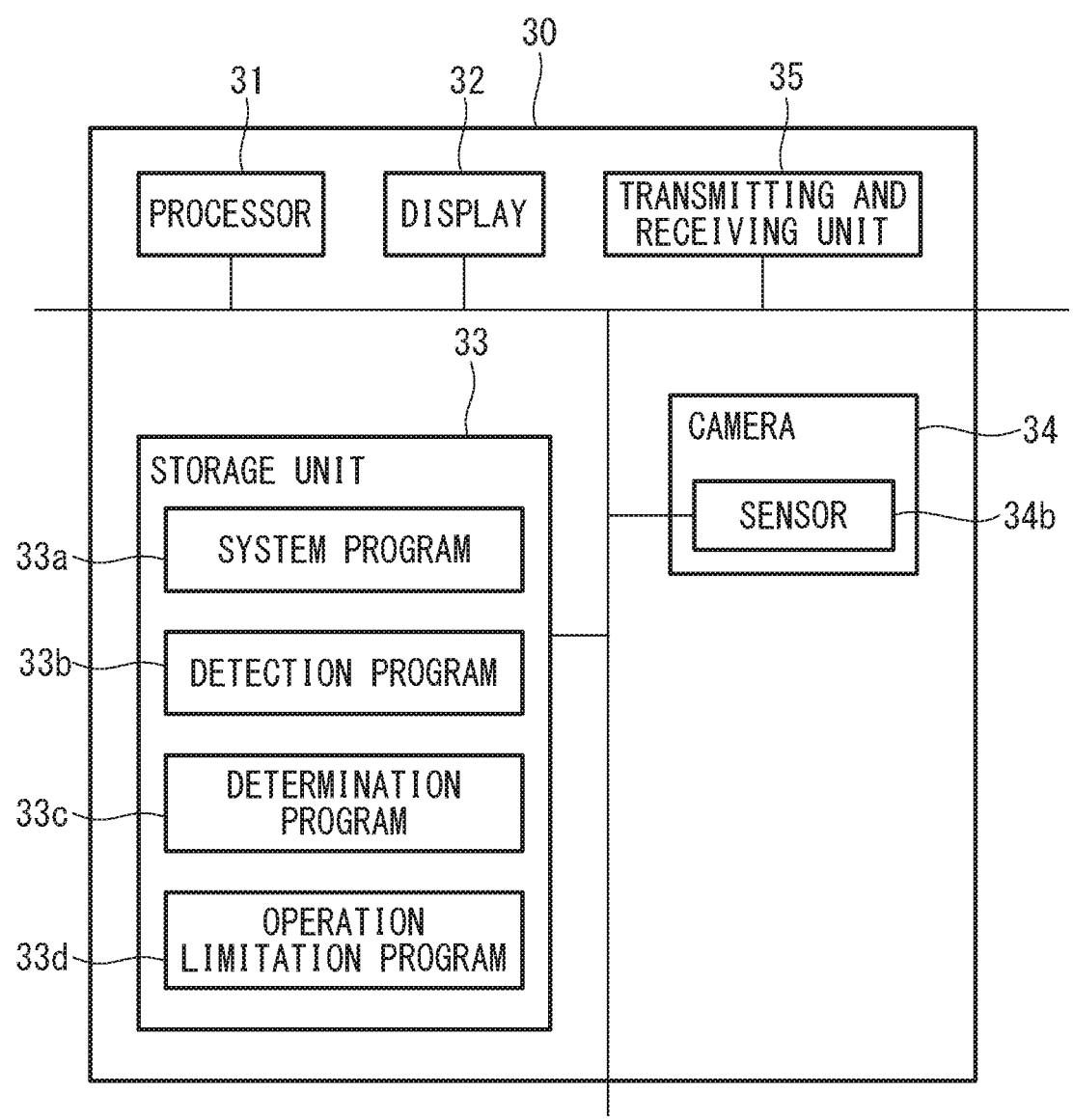
FIG. 4 is a block diagram of an operation panel of the robot of this embodiment.

As shown in FIG. 4, the operation panel 30 of this embodiment includes a processor 31 which is a CPU and the like, a display 32 which is a known touch screen, a storage unit 33 having a non-volatile storage, a ROM, a RAM, and the like, a camera 34, and a transmitting and receiving unit 35. For example, in such a case where the touch screen is a resistance film type, the touch screen has a transparent resistance film which is provided on the surface of the display 32, and in such a case where the touch screen is a capacitance type, the touch screen has a transparent conductive film which is provided on the surface of the display 32.

Figure 2:
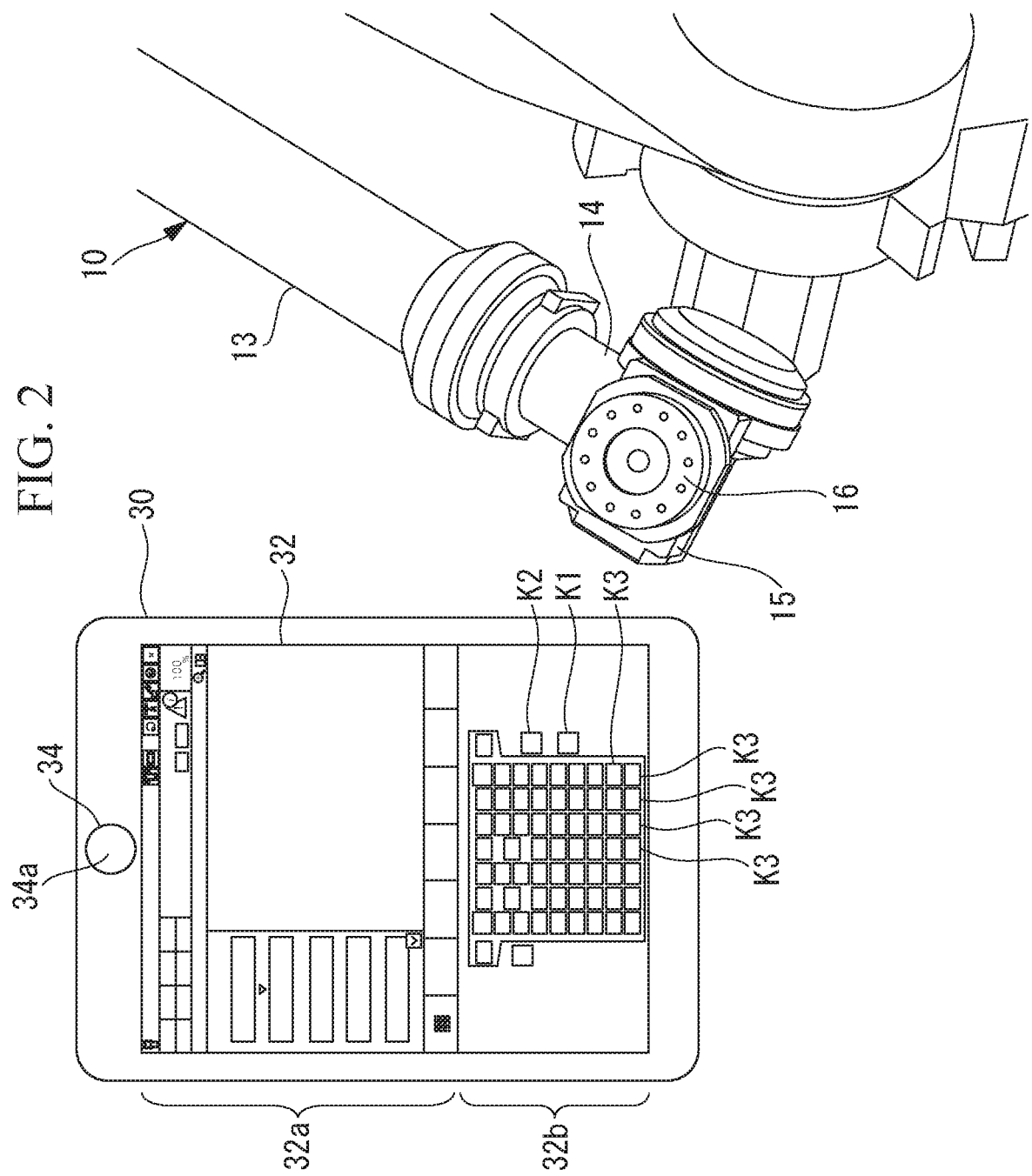
FIG. 2 is a schematic view of the robot of this embodiment which is seen from an operator.

In one example, as shown in FIG. 2, the upper side of the display 32 functions as a display portion 32a, and the lower side of the display 32 functions as an operation portion 32b, on which an operation key K1, an operation key K2, an operation key K3, and the like are placed. That is to say, the display portion 32a and the operation portion 32b are placed on one of the surfaces of the display 32 in the thickness direction. Also, it is possible to set a position of the display portion 32a and that of the operation portion 32b at any places in the display 32. And, there may be a case where the operation keys are also placed in the display portion 32a, and there may also be a case where an input box or the like is displayed in the display portion 32a. In these cases, the operation is performed by touching the display portion 32a by a finger and the like, and the display portion 32a functions as the operation portion.

When the controller 20 is in the manual mode, the control signal, which is in response to input made through the operation key K1, operation key K2, and the like of the operation panel 30, is sent to the controller 20 from the transmitting and receiving unit 35 of the operation panel 30, and the processor 21 of the controller 20 controls the servo controllers 26 and the tool controller 27 in response to the received control signal.

For example, the operation key K1 is for starting motion of the entire robot arm 10 including operation of the servo motors 11a to 16a, and the operation key K2 is for starting operation, for example, of only the servo motors 15a and 16a which are at the distal end portion of the robot arm 10 (move the distal end of the robot arm 10), and the operation key K3 is for performing, for example, a setting, such as a speed setting of the motion of the robot arm 10, a setting of coordinates of a target position, and the like.

The camera 34 includes a lens 34a, and a sensor 34b which is a CMOS sensor and the like which obtains images formed via the lens 34a (FIG. 4).

A system program 33a is stored in the storage unit 33, and the system program 33a provides a basic function of the operation panel 30. And, a detection program 33b, a determination program (a determination means) 33c, and a motion limitation program (a limitation means) 33d are stored in the storage unit 33.

On the basis of the detection program 33b, the processor 31 performs known image processing on images which are sequentially captured by the camera 34, and the processor 31 performs matching processing on the processed images so as to detect positions, size, shapes, and the like of eyes of an operator O. In this embodiment, the processor 31 detects positions, size, shapes, and the like of pupils of the eyes of the operator O. Also, the processor 31 may detect a position, size, a direction, and the like of a face of the operator O so as to determine whether or not the operator O looks at a surface of the operation panel 30 on which the operation portion 32b is provided.

There are differences in the positions, the size, the shapes, and the like of the pupils according to individuals, however, this difference can be reduced or canceled by performing calibration. In order to perform the calibration, for example, the operation panel 30 is placed in a plurality of positions and orientations with respect to the face of the operator O, and the operator O is made to gaze at a predetermined display on the display 32 in this state so that the camera 34 captures images for the calibration while the operation panel 30 is kept being positioned in the above described positions and the orientations. And, the image processing, the matching processing, and the like are performed on the images for the calibration, and the positions, the size, the shapes, and the like of the pupils of the operator O in each of the images for calibration are correlated with shapes, size, and the like of the entire eyes so as to be stored in the storage unit 33. It is possible to determine whether or not the operator O is looking at the display 23 by using the positions, the size, the shapes, and the like of the pupils which are stored as described above, and the images which are sequentially captured by the camera 34. A change (motion) of the positions, size, and the like of the pupils of the operator O may also be one indicator of whether the operator O is looking at the display 32 or not.

On the basis of the determination program 33c, the processor 31 determines whether or not the operator O is looking at the display 32 in response to the positions, the size, the shapes, a change in position, a change in size, and the like of the pupils of the operator O, which are detected by the detection program 33b.

And, on the basis of the motion limitation program 33d, even when the operation key K1 or the operation key K2 are operated, the processor 31 does not send the control signal, which is in response to the operation input by using the operation key K1 or the operation key K2, to the controller 20 while the operator O is looking at the display 32d.

On the other hand, the processor 31 sends the control signal which is on the basis of the operation key K3 to the controller 20. By this, the controller 20 performs the speed setting, a target position setting, and the like of the robot arm 10.

Also, on the basis of the motion limitation program 33d, the processor 31 does not send the control signal which is in response to the operation of the operation key K1 to the controller 20 while the operator O is looking at the display 32, however, the processor 31 may send the control signal which is in response to the operation of the operation key K2 to the controller 20.

In order to improve the safety in operating the robot, a variety of measures are taken, and a variety of functions are implemented in robots, however, higher safety is required in operating the robot. Therefore, further measures, functions, and the like are required.

One example of typical scenes in which the operator O is exposed to a danger is a scene in which the operator O teaches the motion of the robot arm 10. It has become normal that the teaching of the motion of the robot arm 10 is performed offline by using a simulation device.

However, even in a case where the teaching of the motion is performed offline, a detailed motion setting of the robot arm 10 which matches positional relation between the tool located at the distal end of the robot arm 10 and an operation target, a detailed motion setting of the tool located at the distal end of the robot arm 10 at the time of performing operations, and the like are conducted at a factory floor by using an actual operation target. In order to perform the detailed operation setting, the operator O stands close to the robot arm 10 and moves the robot arm 10 little by little by using the operation panel 30, for example. At this time, the operator O perform the operations while looking at the display portion 32a, the operation keys K1, K2, K3, and the like on the operation panel 30, and moves the robot arm 10 by operating predetermined operation keys K1, K2 on the operation panel 30.

The robot arm 10 includes a plurality of arm members (movable portions) 11 to 16, and a plurality of servo motors (driving devices) 11a to 16a which respectively drive the plurality of arm members 11 to 16, and therefore, it is often not easy to move the arm members 11 to 16 and the servo motors 11a to 16a as intended. Also, due to deflection of the robot arm 10, backlash of the servo motors 11a to 16a and speed reducers, and the like, even when the coordinates of the next motion position is input numerically and the like on the operation panel 30, there is a case where an arrival position of the motion of the robot arm 10 is slightly different from the input position. Further, in response to a type of the operation target, it may be required to perform a detailed setting of a distal end position of the robot arm 10, the position of the tool, and the motion of the distal end portion of the robot arm 10 and the tool, and the like. Accordingly, it is often the case that the operation while looking at the display 32, the operation key K3, and the like on the operation panel 30, and the operation which moves the robot arm 10 by operating the operation keys K1, K2 on the operation panel 30 are repeatedly performed for dozens of times or hundreds of times.

According to this embodiment, the determination of whether or not the operator O is looking at the surface of the operation panel 30 on which the operation portion 32b is provided on the basis of the images captured by the camera 34, and when it is determined that the operator O is looking at the surface, the motion of the robot arm 10 is limited.

It is possible to accurately determine whether or not the operators 0 is looking at the surface of the operation panel 30 on which the operation portion 32b is provided as compared with a determination of whether or not the operator O is looking at an operation area of the robot.

Also, the determination of whether or not the operator O is looking at the surface on which the operation portion 32b is provided is made on the basis of the images captured by the camera 34 which is provided on the operation panel 30. Since the camera 34 is provided on the operation panel 30, positional relation between the operation panel 30 and the camera 34 does not change, or does not change drastically. This is advantageous for accurately making the above described determination which is on the basis of the images captured by the camera 34.

As described above, when the operation while looking at the display portion 32a, the operation key K3, and the like on the operation panel 30, and the operation which moves the robot arm 10 by operating the operation keys K1, and K2 on the operation panel 30 are repeatedly performed for dozens of time or hundreds of times, it may happen that the operator O performs the operation for starting motion of the robot arm 10 on the operation panel 30 while the operator O has continuously been looking at the operation portion 32b of the operation panel 30. Even in such a case where the operator O is well aware of a rule which prohibits the operator O from operating the robot arm 10 while looking at the operation panel 30, there occurs a case where the operator O does not follow the rule due to the fact that the above described operations has been performed repeatedly.

In this embodiment, in such a case where it is determined that the operator O is looking at the surface of the operation panel 30 on which the operation portion 32b is provided, the robot arm 10 is not started to move even when the operation for starting motion of the robot arm 10 is performed on the operation portion 32b. This is capable of reducing a risk, such as contact of the robot arm 10 and the operator O, and the like, especially at the time of repeating the above procedures, which is extremely advantageous for improving the safety of the operator O.

In such a case where operation keys, which are pushed physically, are provided on the operation panel 30, in order to operate a target operation key, the operator O pushes the target operation key after putting a finger on the target operation key. And therefore, after the operator O puts the finger on the target operation key while looking at the operation key, the operator O is capable of accurately operating the target operation key even when the operator O is looking at the robot arm 10.

However, in such a case where the operation panel 30 is a tablet computer, the operation keys K1, K2, K3 are displayed on the display 32 of the tablet computer. In order to operate, for example, the operation key K1 which is displayed on the display 32, the operator O is required to touch the operation key K1 by the finger and the like of the operator O while looking at the display 32. And, the operation of the operation key K1 is performed at a point in time where the finger and the like comes into contact with the operation key K1.

As described above, in such a case where the operation panel 30 is the tablet computer, line of sight of the operator O tends to be in a direction of the operation keys K1, K2, K3. In this embodiment, the motion of the robot arm 10 is limited in a state where the operator O is looking at the surface on which the operation portion 32b is provided on the operation panel 30, which improves the safety of the operator O.

Also, on the basis of the determination program 33c, the processor 31 may determine whether or not the operator O has continuously been looking at the display 32 beyond a predetermined time, and the determination is made in response to the positions, the size, the shapes, the change in the position, the change in the size, and the like of the pupils of the operator O, which are detected by the detection program 33b. In this case, in such a case where the operator O has continuously been looking at the display 32 beyond the predetermined time, the processor 31 does not send the control signal which is in response to the operation of the operation key K1 or the operation key K2 to the controller 20. It is possible to use several seconds as the predetermined time.

It is highly possible that the operator O is preoccupied with the operation of the operation panel 30 when the operator O has continuously been looking at the display 32 beyond the predetermined time, and therefore, this configuration is advantageous for improving the safety of the operator O.

Also, information of whether or not the operator O is looking at the display 32 may be sequentially sent to the controller 20 from the operation panel 30. In this case, on the basis of a motion limitation program (a limitation means) which is stored in the storage unit 23, the processor 21 of the controller 20 limits the motion of the robot arm 10 as described above when it is determined that the operator O is looking at the display 32, or when it is determined that the operator O has continuously been looking at the display 32 beyond the predetermined time.

Moreover, in this embodiment, when the speed setting of the robot arm 10 is changed to high speed by the operation key K3, the processor 31 may set the predetermined time so that the predetermined time becomes shorter.

The predetermined time is changed in response to the change of the speed setting of the robot arm 10 as described above, and therefore, the safety of the operator O is accurately secured.

And, in this embodiment, a distance detection device (a distance detection means) which detects distance between the robot arm 10 and the operation panel 30 is provided, and the processor 31 may make the predetermined time shorter when a detected distance value which is detected by the distance detection device becomes smaller.

As the distance detection means, it is possible to use a transmitter of a signal of a short-range wireless communication which is provided at the distal end portion of the robot 10, and a receiver which is provided at the operation panel 30. The operation panel 30 is capable of detecting the distance between the transmitter and the receiver in response to strength of the signal which is received by the receiver.

When the operation panel 30 gets closer to the robot arm 10, it is highly possible that the operator O who has the operation panel 30 also gets closer to the robot arm 10. And, it is possible to detect the distance between the operation panel 30 and the robot arm 10 relatively accurately. And therefore, the safety of the operator O is secured more certainly.

Figure 5:
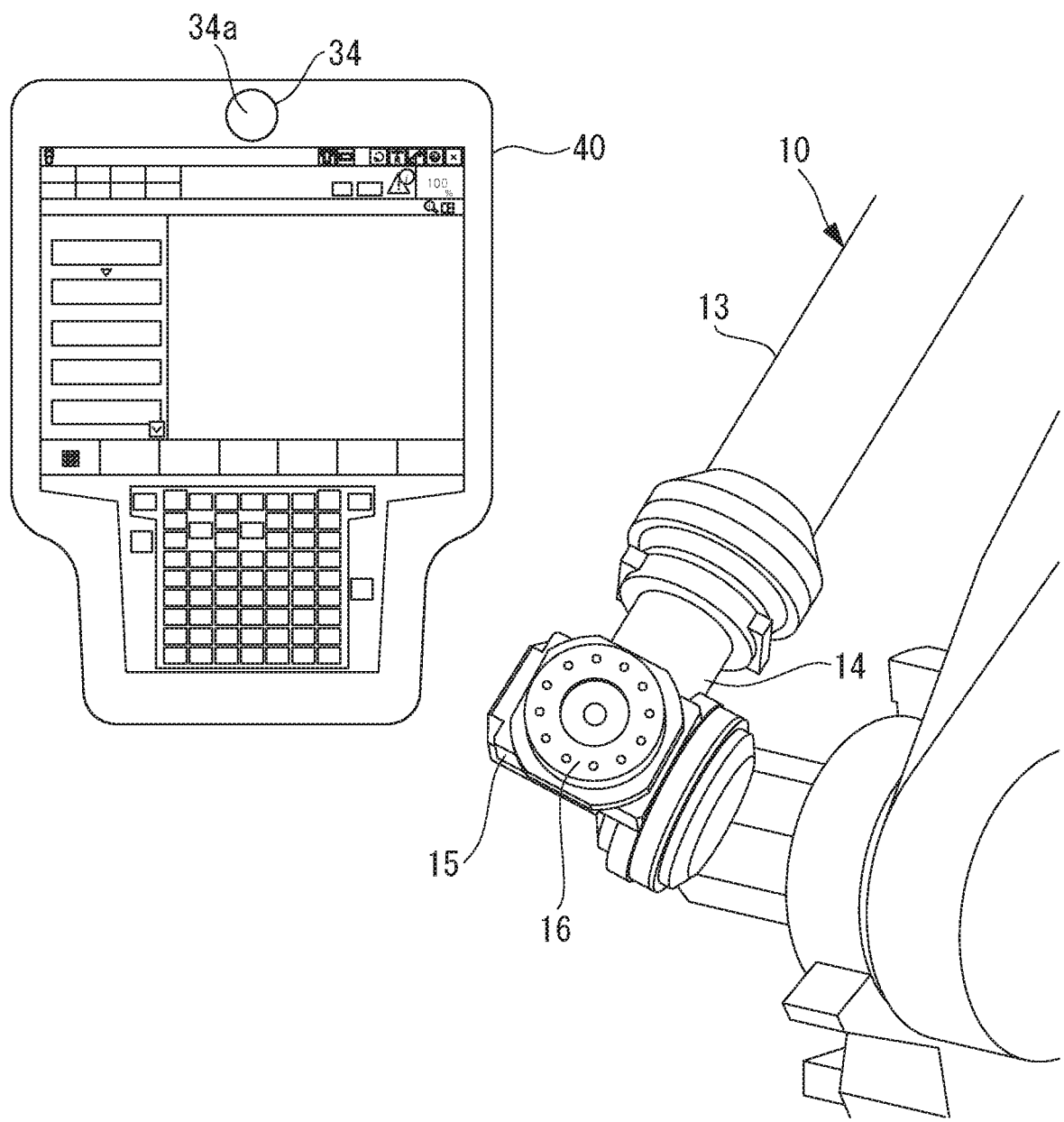
FIG. 5 shows a modified example of the operation panel of this embodiment and a schematic view of a robot.

Also, instead of using the operation panel 30 which is the tablet computer, it is also possible to use an operation panel 40 which is a conventional teach pendant, on which the camera 34 is provided (refer to FIG. 5). In this case also, the motion of the robot arm 10 is limited in a state where the operator O is looking at the surface on which the operation portion is provided on the operation panel 40, and therefore, the same effect as described above can be obtained.

And, in the above embodiments, on the basis of the images captured by the camera 34, the operation speed of the robot arm 10 may be limited when the operation keys K1, K2 are operated in a state where it is determined that the operator O is looking at the surface on which the operation portion 32b is provided on the operation panel 30.

Also, in the above embodiment, after the robot arm 10 has started to move, the operation speed of the robot arm 10 may be reduced without suspending the motion of the robot arm 10 in such a case where it is determined that the operator O has continuously been looking at the display 32 beyond the predetermined time.

The following aspects of the present invention are derived from the above disclosure.

A robot according to a first aspect of the present invention includes a robot arm; a controller which controls the robot arm; an operation panel which sends a control signal to the controller; a camera which is provided in the operation panel and which captures images of an operator who operates the operation panel; a determination means which determines whether or not the operator is looking at a surface of the operation panel on which an operation portion is provided on the basis of the images captured by the camera; and a limitation means which limits motion of the robot arm when it is determined that the operator is looking at the surface or when it is determined that the operator has continuously been looking at the surface beyond a predetermined time.

In order to improve safety in operating the robot, a variety of measures are taken, and a variety of functions are implemented, however, higher safety is required in operating the robot. Therefore, further measures, functions, and the like are required.

One example of typical scenes in which the operator is exposed to danger at the time of operating the robot is a scene in which the operator teaches motion of the robot arm. It has become normal that the teaching of the motion of the robot arm is performed offline by using the simulation device.

However, even in a case where the teaching of the motion is performed offline, a detailed motion setting which matches positional relation between a tool located at the distal end of the robot arm and an operation target, a detailed motion setting of the tool located at the distal end of the robot arm at the time of performing operations, and the like are performed at a field site by using an actual operation target. In order to perform the detailed motion setting, the operator stands close to the robot arm so as to move the robot arm little by little by using the operation panel, for example. At this time, the operator performs the operations while looking at the display portion, the operation keys, and the like on the operation panel, and moves the robot arm by operating a predetermined operation key on the operation panel.

The robot arm includes a plurality of movable portions, and a plurality of driving apparatuses which respectively drives the plurality of movable portions, and therefore, it is often not easy to move the movable portions and the driving apparatuses as intended. Also, due to deflection of the robot arm, backlash of the driving apparatuses and speed reducers, and the like, even when the coordinates of a next motion position is input numerically and the like on the operation panel, there is also a case where an arrival position of the motion of the robot arm is slightly different from the input position. Further, in response to a type of the operation target, there is also a case where a detailed setting of a position of the distal end of the robot arm, the position of the tool, the motion of the distal end of the robot arm and the tool, and the like needs to be performed. Accordingly, it is often the case that the operation while looking at the display on the operation panel, and the operation which moves the robot arm by operating a predetermined operation key on the operation panel are repeatedly performed for dozens of times or hundreds of times.

In the above aspect, a determination on whether or not the operator is looking at the surface of the operation panel on which the operation portion is provided, and when it is determined that the operator is looking at the surface, or when it is determined that the operator has continuously been looking at the surface beyond the predetermined time, the motion of the robot arm is limited.

A surface on which the operation portion is provided is made unmovable in each operation panel. And therefore, it is possible to accurately determine whether or not the operator is looking at the surface of the operation panel on which the operation portion is provided as compared with the determination on whether or not the operator is looking at the operation area of the robot.

Also, the determination on whether or not the operator is looking at the surface of the operation panel on which the operation portion is provided is made on the basis of the images captured by a camera which is provided on the operation panel. Since the camera is provided on the operation panel, positional relation between the operation panel and the camera does not change, or does not change drastically. This is advantageous for accurately making the above determination which is on the basis of the images captured by the camera.

With the above aspect, preferably, the motion limitation prevents the robot arm from starting its motion even when an operation for starting motion of the robot arm is performed on the operation portion.

As described above, when the operation while looking at the display portion, the operation keys, and the like on the operation panel, and the operation for moving the robot arm by operating a predetermined operation key on the operation panel are repeatedly performed for dozens of times or hundreds of times, it may happen that the operator performs the operation which starts moving the robot arm on the operation panel while the operator keeps looking at the operation portion of the operation panel. Even in such a case where the operator is well aware of a rule which prohibits the operator from moving the robot arm while looking at the operation panel, there occurs a case where the operator does not follow the rule due to the fact that the above described operations are performed repeatedly.

In this aspect, in such a case where it is determined that the operator is looking at the surface on which the operation portion is provided, or where it is determined that the operator has continuously been looking at the surface beyond the predetermined time, the robot arm is not started to move even when the operation which starts moving the robot arm is performed on the operation portion. This is capable of reducing a risk, such as contact of the robot arm and the operator, and the like, especially at the time of repeating the above described operations, which is extremely advantageous for improving the safety of the operator.

With the above aspect, preferably, the operation panel is a tablet computer.

In such a case where operation keys, which are pushed physically, are provided on the operation panel, in order to operate a target operation key, the operator pushes the target operation key after putting a finger on the target operation key. And therefore, after the operator puts the finger on the target operation key while looking at the target operation key, the operator is capable of accurately operating the target operation key even when the operator is looking at the robot arm.

However, in such a case where the operation panel is the tablet computer, the operation keys are displayed on the display of the tablet computer. In order to operate the target operation key which is displayed on the display, the operator is required to touch the target operation key by the finger and the like of the operator while looking at the display. And, the operation of the target operation key is performed at a point in time when the finger or the like comes into contact with the target operation key.

As described above, in such a case where the operation panel is the tablet computer, line of sight of the operator tends to be in a direction of the operation keys. However, the motion of the robot arm is limited in a state where the operator is looking at the surface of the operation panel on which the operation portion is provided, and therefore, the safety of the operator is improved.

In the above aspect, preferably, the motion limitation limits the motion of the robot arm corresponding to a part of operation keys on the operation portion.

For example, when the part of the operation keys includes an operation key which starts moving the entire robot arm by means of the plurality of servo motors including a distal end side servo motor, and when the part of the operation keys does not include an operation key which makes the distal end of the robot arm start performing one or two types of motions, in a state where the operator is looking at the surface of the operation panel on which the operation portion is provided, the operator can move the distal end of the robot arm, however, the operator cannot move the entire robot arm.

In the above aspect, preferably, when it is determined that the operator is looking at the surface or when it is determined that the operator has continuously been looking at the surface, even when an operation on the part of the operation keys on the operation portion is performed, the limitation means prevent a control signal, which is on the basis of the operation, from being sent to the controller.

With this aspect, in a state where the operator is looking at the surface of the operation panel on which the operation portion is provided, the control signal, which is on the basis of the part of the operation keys, is not sent to the controller, which certainly prevents the robot from being moved on the basis of the part of the operation keys in such state.

In the above aspect, preferably, the limitation means makes the predetermined time shorter when a speed setting of the robot arm is changed to high speed.

In this aspect, the predetermined time is changed in response to the change of the speed setting of the robot arm, which secures the safety of the operator more certainly.

With the above aspect, preferably, the robot includes a distance detection means which detects distance between the robot arm and the operation panel, wherein the limitation means makes the predetermined time shorter when a detected distance value detected by the distance detection means becomes smaller.

When the operation panel gets closer to the robot arm, it is highly possible that the operator who has the operation panel also gets closer to the robot arm. Also, it is possible to detect the distance between the operation panel and the robot arm relatively accurately. And therefore, with this aspect, the safety of the operator is more certainly secured.

According to the above aspects, it is possible to effectively improve safety in operating a robot arm.

REFERENCE SIGNS LIST 10 robot arm
11 to 16 arm members
11a to 16a servo motors
20 controller
21 processor
22 display
23 storage unit
23a system program
23b operation program
23c manual operation program
30 operation panel
31 processor
32 display
32a display portion
32b operation portion
33 storage unit
33a system program
33b detection program
33c determination program (determination means)
33d motion limitation program (limitation means)
34 camera
34a lens
34b sensor
40 operation panel
J1 to J6 movable axes
K1 to K3 operation keys

The invention claimed is:

1. A robot comprising:
a robot arm;
a controller which controls the robot arm;
an operation panel which sends a control signal to the controller;
a camera which is provided in the operation panel and which captures images of an operator who operates the operation panel;
a determination means which determines whether or not the operator is looking at a surface of the operation panel on which an operation portion is provided on the basis of the images captured by the camera; and
a limitation means which limits motion of the robot arm when it is determined that the operator:
is looking at the surface; or has continuously been looking at the surface beyond a non-zero predetermined time.

2. The robot according to claim 1, wherein, the motion limitation prevents the robot arm from starting its motion even when an operation for starting motion of the robot arm is performed on the operation portion.

3. The robot according to claim 1, wherein the operation panel is a tablet computer.

4. The robot according to claim 1, wherein the motion limitation limits the motion of the robot arm corresponding to a part of operation keys on the operation portion.

5. The robot according to claim 4, wherein, when it is determined that the operator is looking at the surface or has continuously been looking at the surface, even when an operation on the part of the operation keys on the operation portion is performed, the limitation means prevent a control signal, which is on the basis of the operation, from being sent to the controller.

6. The robot according to claim 1, wherein the limitation means makes the non-zero predetermined time shorter when a speed setting of the robot arm is changed to high speed.

7. The robot according to claim 1 comprising:
a distance detection means which detects distance between the robot arm and the operation panel; and
wherein the limitation means makes the non-zero predetermined time shorter when a detected distance value detected by the distance detection means becomes smaller.

* * * * *